United States Patent

Girardi et al.

Patent Number: 5,978,564
Date of Patent: Nov. 2, 1999

[54] METHOD OF ADDRESS PRINTING JUSTIFICATION

[75] Inventors: Victor Girardi, Oxford; Michael Kelley, New Milford; Paul A. Kovlakas, Milford; Campbell Moore, Madison, all of Conn.

[73] Assignee: Pitney Bowes Inc., Stamford, Conn.

[21] Appl. No.: 08/837,829

[22] Filed: Apr. 22, 1997

[51] Int. Cl.[6] .................................. G06F 3/12; G06K 9/00
[52] U.S. Cl. ............................................. 395/117; 382/101
[58] Field of Search ..................................... 395/117, 105; 382/101–102; 364/464.02

[56] References Cited

U.S. PATENT DOCUMENTS

| | | | |
|---|---|---|---|
| 4,574,363 | 3/1986 | Carlgren et al. | 707/531 |
| 4,651,288 | 3/1987 | Zeising | 364/519 |
| 4,725,718 | 2/1988 | Sansone et al. | 235/495 |
| 4,743,747 | 5/1988 | Fougere et al. | 235/495 |
| 4,827,358 | 5/1989 | Matsumoto | 358/296 |
| 5,058,055 | 10/1991 | Takemoto et al. | 395/117 |
| 5,204,959 | 4/1993 | Sakuragi et al. | 345/439 |
| 5,253,334 | 10/1993 | Kimura et al. | 395/102 |
| 5,315,508 | 5/1994 | Bain et al. | 364/401 |
| 5,326,181 | 7/1994 | Eisner et al. | 400/104 |
| 5,420,403 | 5/1995 | Allum et al. | 235/375 |
| 5,583,970 | 12/1996 | Strobel | 395/114 |
| 5,733,051 | 3/1998 | Beadman et al. | 400/83 |
| 5,761,665 | 10/1998 | Gardner et al. | 707/100 |

OTHER PUBLICATIONS

United States Postal Service, Publication 32, "Glossary of Postal Terms", p. 79, May 1997.
United States Postal Service, Publication 28, "Postal Addressing Standards", section "Required Lines for Certain Postal Service Programs", pp. 44–45, Nov. 1997.

*Primary Examiner*—Amelia Au
*Assistant Examiner*—Martin E. Miller
*Attorney, Agent, or Firm*—Charles R. Malandra, Jr.; Melvin J. Scolnick

[57] ABSTRACT

The invention is a method of right justifying a line in an address field to be printed on a mail piece. A list of addresses is submitted as part of a mail piece print job, and a first address is selected from the list. The printing system initializes the vertical edge of the address field; and, after initialization one or more fonts are selected for printing the address field on the mail piece. The address field is scanned by the printing system and an end of line position of the Optional Endorsement Line (OEL) is determined relative to the right vertical edge of the print field. If the end of the line is past the initialized right edge, then the end of line position becomes the new vertical edge delineation and the line is a justified line. If, however, the end of line position is not past the vertical edge, then the initialized edge is retained as the right-most reference point of the print field. Each of the subsequent lines in the address field is scanned for length and an end of line position determined. If the length of the subsequent line exceeds the length of the OEL, then the OEL is extended by adding characters until its length is equal to the length of the longest subsequent line. After scanning each of the lines in the address field for length, the justified line is printed, then each of the subsequent lines of the address field are printed.

7 Claims, 3 Drawing Sheets

METHOD OF ADDRESS PRINTING JUSTIFICATION

BACKGROUND OF THE INVENTION

The present invention relates generally to the field of addressing systems for use in producing mail pieces, and more particularly to a method for producing the Optional Endorsement Line of the address field in a manner that consistently meets the requirements of the U.S. Postal Service.

The challenges of mail delivery within the United States and in the growing ranks of industrialized countries has grown so that, in the United States alone, the postal service delivers approximately 600 million pieces of mail per day. To the growing postal burden is added the requirements of keeping address data accurate and readable by both mail handling machines and the mail carriers that physically deliver the mail. With the need to reduce costs while improving the efficiency and reliability of postal operations, continuous review of methodology and the systems used to implement operations is required. Thus, the growing burden of delivering mail efficiently results in the development of regulations by the United States Postal Service (USPS) that are designed to take the best possible advantage of the technology available for mail handling.

Among the requirements for mail handling, is the printing of an Optional Endorsement Line (OEL) containing certain required data for specific classes of mailings. The requirements also include formatting requirements that must be adhered to when the OEL is printed on a mail piece as part of the destination address block. Further, two specific requirements within the OEL parameters are that the OEL be printed as the top line in a destination address, and that the OEL be right justified relative to the destination block data. Therefore, when properly printed, none of the lines that appear beneath the OEL in a destination address are allowed to have characters that are printed further to the right than the right most character in the OEL.

Though there are a number of applications commercially available for printing destination block data, those applications are generally limited by either the inability to meet the justifications requirements, or those applications place restrictions on the printable region or modify the destination address to ensure justification of the OEL. A further limitation of the prior art, lies in the inability of systems capable of right justification to be able to maintain the integrity of the destination block data while printing each address of the address list. The prior art can set a right justification parameter for a group of addresses, but must manually adjust the parameters as each individual address is printed from the list, or simply maintain the parameter initially selected. A clear limitation then is in the efficiency of the prior art system; or, in the inability of the system to accommodate justification changes for an entire address list rather than simply a single selected parameter.

Some existing applications ensure the right justification of the OEL data statically by restricting the printable area within the destination address block and then extending the OEL so that its right most character is printed at the right most position within the destination address block. This method does not ensure that all addresses will be able to be printed in their entirety because of the restricted print area. In the following example from the prior art, for instance, the printable region is delineated by a dashed line:

```
******************ECRLOT**C003
CALIFORNIA SAVINGS BANK
12595 NW CALIFORNIA BLVD STE
SAN FRANCISCO CA 95010-4399
```

The OEL (the top line) in the above example is extended to print all the way to the right of the printable region. The suite number in the address field was intended to read "STE 101," but because the data exceeded the restricted print region as determined by the OEL, the "101" became truncated. To avoid truncation within the street address line, the application would be required to horizontally compress the printed line to ensure that all the data would be printed.

Other existing applications use a fixed length OEL whose length is pre-determined to ensure that the OEL's right most character will be further to the right than the data which may be printed below it. Unfortunately, this example of the prior art does not guarantee that data for every address line will in fact be shorter than the OEL unless the address list and associated data are scanned or read completely before setting the length of the OEL.

Therefore, it is an object of the present invention to provide for a method of right justification of a single line in a destination address (specifically the OEL), "on the fly," so as to meet the requirements of the USPS without abridging destination address data.

SUMMARY OF THE INVENTION

The invention is a method of right justifying a line in an address field to be printed on a mail piece. The printing is under control of an addressing printer or mailing system.

Address fields are typically comprised of several lines to be printed; the lines include an Optional Endorsement Line as defined by the U.S. Postal Service, and lines which identify: the addressee; street address; city; state; and, zip code of the addressee. The Optional Endorsement Line (OEL) can contain a message or code within the field of characters that make up the OEL.

A list of addresses is submitted as part of a mail piece print job. A first address is selected from the list and the printing system initializes a vertical edge of the address field relative to the media upon which the address is to be printed. After initialization one or more fonts are selected for printing the address field on the mail piece.

The address field is scanned by the printing system and an end of line position of the first of the address lines is determined. The first line is generally the top-most line. The end of line position is determined relative to the right vertical edge of the print field. If the end of the line is past the initialized right edge, then the end of line position becomes the new vertical edge delineation and the line is a justified line. If, however, the end of line position is not past the vertical edge, then the initialized edge is retained as the right-most reference point of the print field.

Each of the subsequent lines in the address field is scanned for length and an end of line position determined. If the length of the subsequent line exceeds the length of the top-most Optional Endorsement Line, then the Optional Endorsement Line is extended by adding characters until its length is equal to the length of the longest subsequent line. After scanning each of the lines in the address field for length, the justified line is printed, then each of the subsequent lines of the address field are printed. The next address on the list is then selected and the justification process is repeated for that address and subsequent addresses. If there is no next available address, then the print job is ended.

DETAILED DESCRIPTION OF THE PREFERRED EMBODIMENTS

Figure 1:
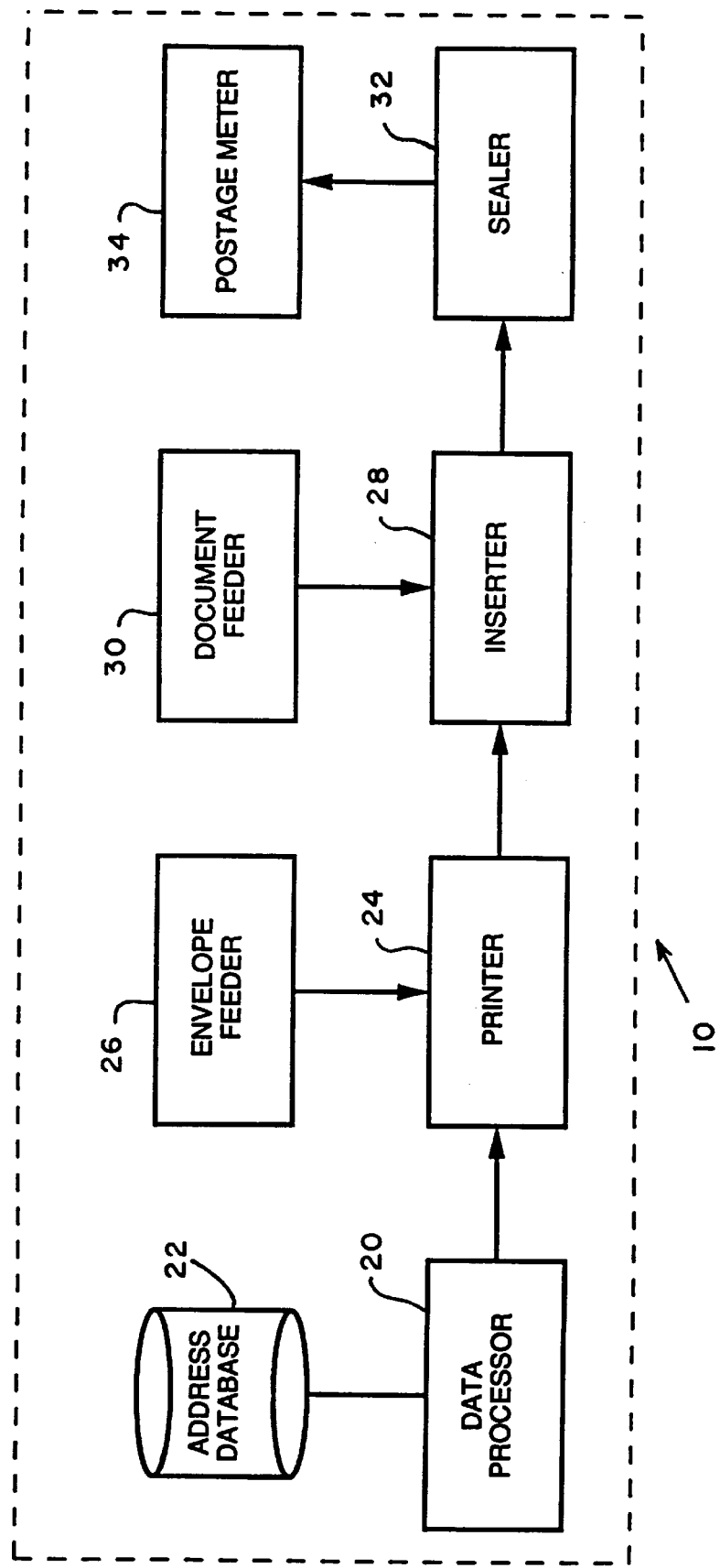
FIG. 1 is block diagram of a typical mailing system that is capable of using the subject method to advantage.

Turning to FIG. 1, there is shown a typical mailing system 10 that could employ the subject invention.

Mailing system 10 is comprised of data processor 20 with address database 22 operatively connected thereto. Address database 22 is generally in the form of a mailing list comprised of successive address fields. The address fields are parsed and downloaded successively to envelope printer 24 which prints each successive address to a corresponding envelope fed to envelope printer 24 by envelope feeder 26 which can be co-located with envelope printer 24 or be a separate device.

The printed envelopes are fed from printer 24 to inserter 28 which inserts documents fed to it by document feeder 30. The inserted envelopes are passed through sealer 32 for sealing. The sealed envelopes are then fed to postage meter 34 where postage value is franked upon each successive envelope before the envelopes are placed into the delivery stream.

Variations of mailing system 10 are known in the mailing and addressing arts; and, integrated systems such as the DocuMatch system available from Pitney Bowes Inc. of Stamford, Conn., are known to combine the features and capabilities of several of the components of mailing system 10.

Figure 2:
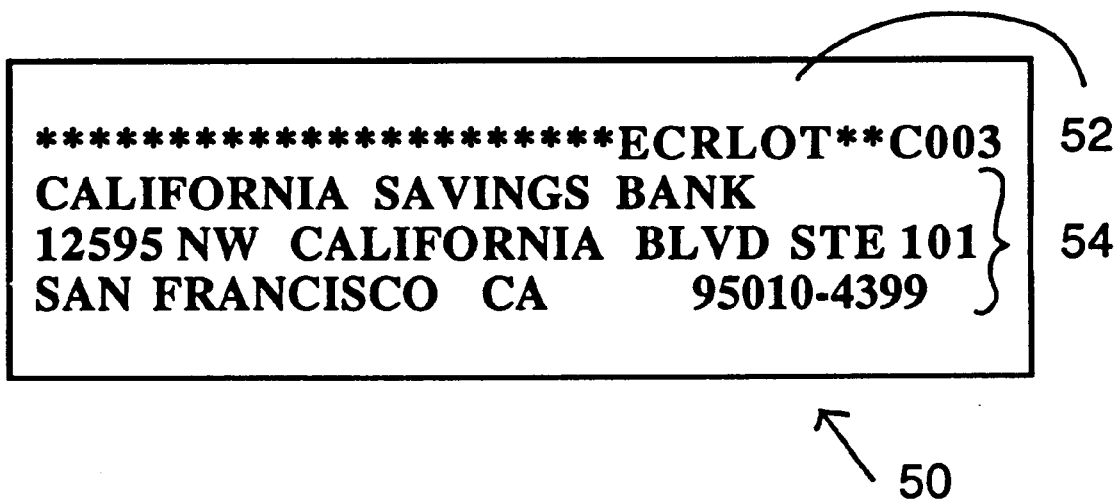
FIG. 2 is a drawing of an address field with an Optional Endorsement Line as the top line.

Address fields can be printed directly to label stock for subsequent application to a mail piece, or can be printed directly to the mail piece. Turning to FIG. 2, there is shown address field 50. Address field 50 is comprised of Optional Endorsement Line 52 which is extended so that it is equal to or greater than the longest of the lines 54.

Figure 3:
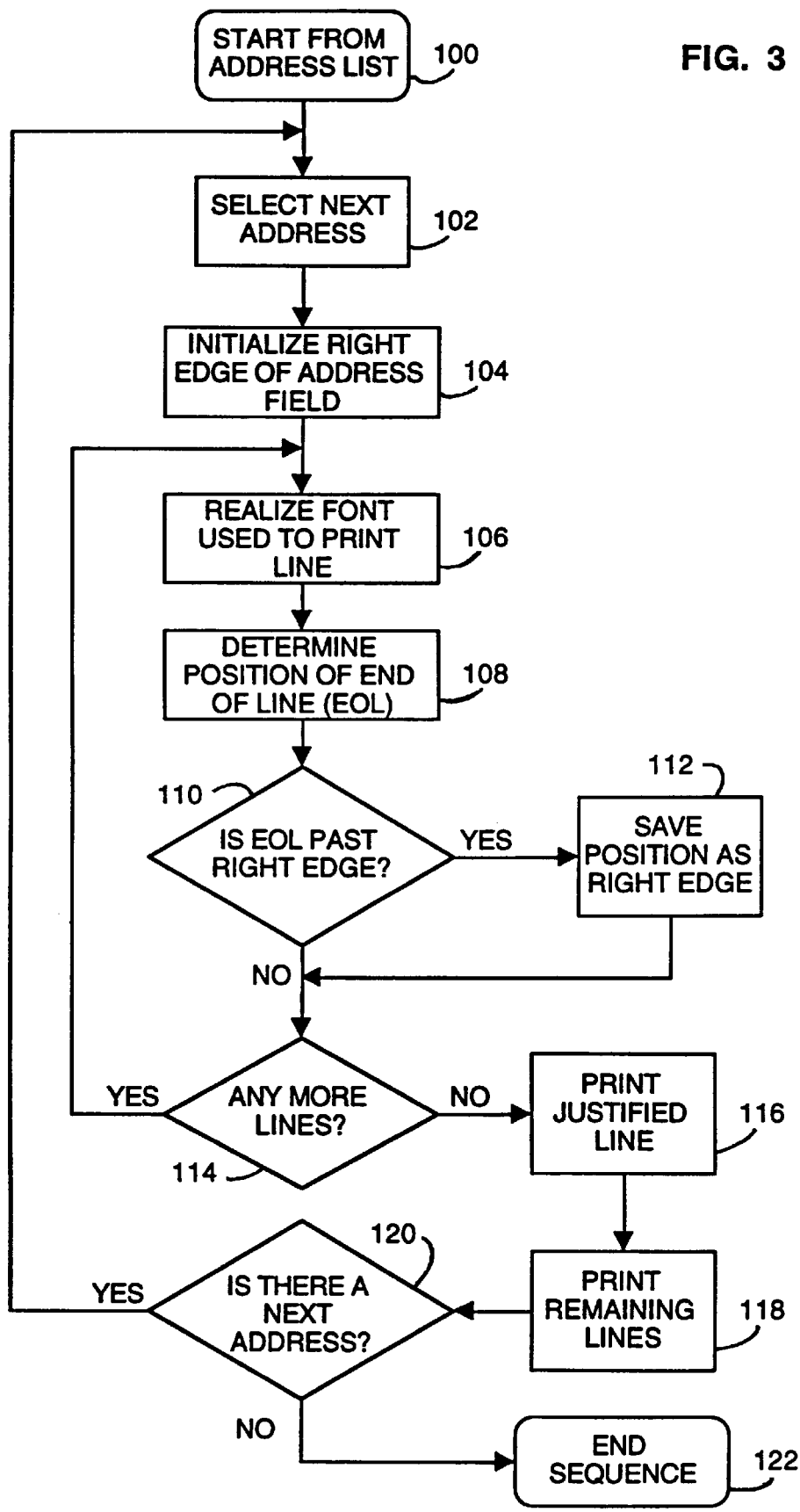
FIG. 3 is a flowchart of the method of the subject invention.

Address field 50 is a preferred embodiment of the end result of the subject method as shown in FIG. 3. Turning to FIG. 3, there is shown step 100 where a mailing system such as that shown in FIG. 1 is scanning from an address list. From the address list at step 100, the method selects at step 102 an address to be printed to a mail piece. The system then advances to step 104.

At step 104, the system initializes the right edge of the address field relative to the media (label stock could be used at this step as well) to be printed upon. Initialization involves aligning the address field so that the print field of the printer element is maximized. From step 104, the method advances to step 106 where a font is selected by the system as based upon either a pre-determined choice by a system operator, or a default setting.

The system then advances to step 108 and determines the position of the end of line (EOL) of the first line; the first line is the Optional Endorsement Line. From step 108, the method advances to a query at step 110. At step 110, the system queries as to whether or not the EOL is past the initialized right edge set at step 104. If the response to the query is "YES," then the system advances to step 112 and saves the EOL position as the new right edge delineation before advancing to re-enter the flow at step 114. If, however, the response to the query at step 110 is "NO," then the system advances directly to step 114. The first line so registered against the initialized right edge is a justified line.

At step 114, the method queries as to whether or not there are any more lines in the address field. If the response to the query is "YES," then the method returns to re-enter flow at step 106. However, if the response to the query at step 114 is "NO," then the system advances to step 116 and prints the justified line before advancing to step 118 and printing the remaining lines. From step 118, the system advances to a query at step 120.

At step 120, the system queries as to whether or not there is a next address to be scanned and printed. If the response to the query at step 120 is "YES," then the system returns to step 102; if, however, the response to the query at step 120 is "NO," then the method and system advance to step 122 and end the print sequence.

As can be appreciated by those skilled in the art, a number of variations of the subject invention are possible. These variations include, but are not limited to: the number of address fields available on a particular address list; the number of lines in each address field; the configuration of the mailing and/or addressing system utilized as a host for the subject method of justification; the size of the print field; and, the variations in font type.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method of right justifying a line in an address field, said field comprising a plurality of lines to be printed as part of a print job, wherein said method comprises the steps of:

(a) selecting an address from a list wherein said list comprises at least one address;

(b) initializing a vertical edge of a mail piece upon which said address is to be printed;

(c) selecting a font for printing said address on said mail piece;

(d) determining an end of line position of a first of said plurality of lines wherein said end of line position is relative to said vertical edge; and, if said end of line is past said vertical edge, then saving said position as a new vertical edge, and said line as a justified line; and, if said end of line position is not past said vertical edge, then retaining said vertical edge;

(e) scanning said address field for subsequent lines of said plurality of lines and performing step (d) on each of said subsequent lines until each of said plurality of lines has been scanned and adjusting the length of said first line to that of the longest subsequent line if said first line length is less than the length of said subsequent line;

(f) printing said justified line;

(g) printing each of said plurality of lines that have not yet been printed; and (h) selecting a next address from said list and applying steps (b) through (g) above to said next address; and, if there is no next available address, then ending said print job.

2. The method of claim 1, wherein said vertical edge is the right edge of said address field.

3. The method of claim 1, wherein said vertical edge is the left edge of said address field.

4. The method of claim 1, wherein said first line is the top line of said address field and wherein said top line is an Optional Endorsement Line.

5. A method of printing a plurality of lines which together comprise a first address field on a list of address fields wherein the top most line is an Optional Endorsement Line; said method comprising the steps of:

(a) determining a right most position in said address field wherein said right most position is equal to a longest of said plurality of lines within a pre-determined print field;

(b) extending said Optional Endorsement Line so that said Optional Endorsement Line is at least equal to said longest line;

(c) printing said Optional Endorsement Line in said pre-determined print field;

(d) printing in said print field each remaining line of said plurality of lines; and (e) selecting a next address field and repeating each of said steps 5(*a*) through 5(*e*) for said next address field and for subsequent address fields until each address field on said list has been printed.

6. The method of claim 5, wherein said extension of said Optional Endorsement Line is performed by adding one or more characters to said Optional Endorsement Line.

7. The method of claim 5, wherein a set of characters comprising said Optional Endorsement Line is pre-selected and wherein additional characters are added to extend said Optional Endorsement Line until said Optional Endorsement Line is equal to or greater than said longest line.

\* \* \* \* \*